United States Patent
Pirbhai et al.

(10) Patent No.: US 10,257,016 B2
(45) Date of Patent: Apr. 9, 2019

(54) VIRTUAL LEASED LINE ADDRESS RESOLUTION PROTOCOL CACHE FOR CUSTOMER EDGE INTERNET PROTOCOL ADDRESSES

(75) Inventors: Shafiq Pirbhai, Ottawa (CA); Ron Haberman, Antwerp (BE); Mustapha Aissaoui, Kanata (CA)

(73) Assignee: WSOU Investments, LLC, Los Angeles, CA (US)

( * ) Notice: Subject to any disclaimer, the term of this patent is extended or adjusted under 35 U.S.C. 154(b) by 1258 days.

(21) Appl. No.: 12/480,456

(22) Filed: Jun. 8, 2009

(65) Prior Publication Data

US 2010/0309915 A1 Dec. 9, 2010

(51) Int. Cl.
*H04L 12/763* (2013.01)
*H04L 29/12* (2006.01)

(52) U.S. Cl.
CPC .. *H04L 29/12028* (2013.01); *H04L 29/12811* (2013.01); *H04L 61/103* (2013.01); *H04L 61/6009* (2013.01)

(58) Field of Classification Search
CPC ........... H04L 61/2503; H04L 29/12018; H04L 61/10; H04L 41/12; H04L 29/12811; H04L 29/12028; H04L 61/103; H04L 61/6009; H04W 8/26
USPC .................... 370/389, 392, 393, 475, 395.54
See application file for complete search history.

(56) References Cited

U.S. PATENT DOCUMENTS

| | | | |
|---|---|---|---|
| 6,754,622 B1 * | 6/2004 | Beser et al. | 704/226 |
| 6,928,576 B2 * | 8/2005 | Sekiguchi | 714/4.3 |
| 6,987,743 B2 * | 1/2006 | Chen et al. | 370/328 |
| 7,046,666 B1 * | 5/2006 | Bollay et al. | 370/392 |
| 7,827,310 B1 * | 11/2010 | Haberman et al. | 709/245 |
| 2002/0178398 A1 * | 11/2002 | Sekiguchi | 714/4 |
| 2004/0167988 A1 * | 8/2004 | Rune et al. | 709/238 |
| 2008/0008183 A1 * | 1/2008 | Takagaki et al. | 370/392 |
| 2008/0084891 A1 * | 4/2008 | Balus et al. | 370/409 |
| 2008/0219273 A1 * | 9/2008 | Kaneko | 370/401 |
| 2008/0247399 A1 * | 10/2008 | Hazard | 370/395.31 |
| 2009/0003241 A1 * | 1/2009 | Teng | 370/254 |

(Continued)

OTHER PUBLICATIONS

Shah, H et al., ARP Mediation for IP Interworking of Layer 2 VPN draft-ietf-l2vpn-arp-mediation-09.txt, L2VPN Working Group, Feb. 2008.

*Primary Examiner* — Hoang-Chuong Q Vu
(74) *Attorney, Agent, or Firm* — Sean D. Burdick (57) ABSTRACT

Various exemplary embodiments relate to a provider edge node and a method performed on the node including one or more of the following: storing, in a cache on the node, an association between an Internet Protocol (IP) address of the customer edge device and a Media Access Control (MAC) address of the customer edge device; storing, in a backup memory in the node, a copy of the last-known IP address of the customer edge device; removing the stored association from the cache in response to a cache-clearing event, while maintaining the copy of the last-known IP address in the backup memory; sending an address discovery message, the address discovery message requesting an updated MAC address corresponding to the last-known IP address maintained in the backup memory; and updating the cache to reflect the updated MAC address upon receipt of an additional address update message from the customer edge device.

18 Claims, 4 Drawing Sheets

(56) References Cited

U.S. PATENT DOCUMENTS

| | | | |
|---|---|---|---|
| 2009/0003252 A1* | 1/2009 | Salomone et al. | 370/311 |
| 2009/0119414 A1* | 5/2009 | Estrada et al. | 709/245 |
| 2009/0285089 A1* | 11/2009 | Srinivasan | 370/218 |
| 2010/0042714 A1* | 2/2010 | Choi et al. | 709/223 |
| 2010/0151816 A1* | 6/2010 | Besehanic et al. | 455/405 |
| 2010/0272107 A1* | 10/2010 | Papp et al. | 370/392 |
| 2010/0293225 A1* | 11/2010 | Sebes et al. | 709/203 |
| 2011/0038292 A1* | 2/2011 | Salomone et al. | 370/311 |

* cited by examiner

| | 310 | 320 | |
|---|---|---|---|
| | IP Address | MAC Address | |
| 330 | 69.192.3.82 | 00:D0:F6:10:E3:00 | 360 |
| 340 | 135.245.1.1 | 00:E0:B1:FF:AE:10 | 370 |
| 350 | 135.245.68.2 | 00:E0:B1:A0:26:9E | 380 |

| | 410 | |
|---|---|---|
| | IP Address | |
| 430 | 69.192.3.82 | |
| 440 | 135.245.1.1 | |
| 450 | 135.245.68.2 | |

VIRTUAL LEASED LINE ADDRESS RESOLUTION PROTOCOL CACHE FOR CUSTOMER EDGE INTERNET PROTOCOL ADDRESSES

TECHNICAL FIELD

Embodiments disclosed herein relate generally to implementation of Virtual Leased Line services and, more particularly, to minimizing service interruptions in a provider edge node supporting such services.

BACKGROUND

Modern data communication networks play a critical role in everyday interpersonal interactions. In particular, the global nature of data communication networks allows instantaneous communication with anyone, anywhere in the world. Given these benefits, it is not surprising that some experts estimate that traffic on the world's networks will continue to double every two years.

As these networks have expanded, customers of data communications service providers have increased their expectations. For example, many corporations have a number of geographically-scattered local networks, yet desire seamless communication between each of the networks. As a similar example, many businesses desire to link voice traffic between individual sites.

Formerly, guaranteeing a high quality of service for such arrangements required the customer to lease a separate line for use in transporting data belonging to Layer 2 of the Open Systems Interconnection (OSI) model. Though reliable and effective in meeting the customers' needs, the use of such leased lines proved to be an expensive solution.

Given the worldwide reach of Internet Protocol (IP) networks, service providers saw an opportunity to capitalize on the existing IP infrastructure. In particular, to address the demand for transparent transport of data from one site to another, service providers developed so-called Virtual Leased Line (VLL) services. VLL services are also known as Virtual Private Wire Services (VPWS). Using VLL services, a service provider may seamlessly transfer a customer's Layer 2 traffic (e.g., Ethernet, Asynchronous Transfer Mode (ATM), and Frame Relay) over an IP network.

In a typical VLL arrangement, a customer desires to transmit data from a local customer edge device to a remotely-located, far-end customer edge device. To facilitate this arrangement, the service provider implements two provider edge nodes, one on each side of an IP network between the customer edge devices. To exchange data between the customer edge devices, the customer need only connect each customer edge device to a corresponding provider edge node. The provider edge nodes, in turn, encapsulate the Layer 2 data, forward the Layer 3 data to one another over an IP pseudowire, then transmit the Layer 2 data to the Layer 2 address of the destination customer edge device.

It should be apparent from this description that, in order to properly forward data to the destination customer edge device, the connected provider edge node must be aware of the IP address and Media Access Control (MAC) address of the customer edge device. To avoid the time-consuming process of manually specifying each address, many service providers implement an automatic discovery process in which each customer edge device informs the provider edge node of its IP address and MAC address. In some situations, such as failure of the provider edge link, however, the provider edge node will remove or otherwise lose the IP to MAC address mappings. Furthermore, the customer edge device may be unaware of the problem when it is connected over a Layer 2 switch and, in such a circumstance, will not send an additional message notifying the provider edge node of its addresses.

In view of the foregoing, it would be desirable to implement a provider edge node that allows for automatic discovery of IP and MAC addresses, while providing a mechanism to maintain updated MAC address to IP address associations of connected customer edge devices, even in the event of failure of the provider edge node. Other desirable aspects will be apparent to those of skill in the art upon reading and understanding the present specification.

SUMMARY

In light of the present need for a provider edge node that maintains updated MAC address to IP address associations of connected customer edge devices, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a provider edge node and a method performed on the provider edge node. The provider edge node may maintain a cache including an association between an Internet Protocol (IP) address of a customer edge device and a Media Access Control (MAC) address of the customer edge device. The provider edge node may also maintain a backup memory storing a copy of a last-known IP address of the customer edge device.

In response to a cache-clearing event, the node may remove the stored association from the cache, while maintaining the copy of the IP address in the backup memory. Then, at a time subsequent to removal of the stored association from the cache, the node may send an address discovery message requesting an updated MAC address corresponding to the last-known IP address maintained in the backup memory. Finally, the provider edge node may update the cache to reflect the updated MAC address upon receipt of an additional address update message from the customer edge device, then resume transmission of data packets to the MAC address of the customer edge device included in the additional address update message.

It should be apparent that, in this manner, various exemplary embodiments allow a provider edge node to maintain an updated IP to MAC address mapping, thereby minimizing delays in restoring service. By maintaining a backup memory including the last-known IP address of a customer edge device, a provider edge node may quickly resume service after an event requiring that its cache be cleared. More specifically, the provider edge node may send an address discovery message to the last-known IP address of the customer edge device without waiting for an address update message or increasing the rate of such messages from customer edge devices. Such an arrangement minimizes delays in restoring service, while avoiding an unnecessary increase in traffic due to more frequent messaging.

BRIEF DESCRIPTION OF THE DRAWINGS

In order to facilitate better understanding of various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
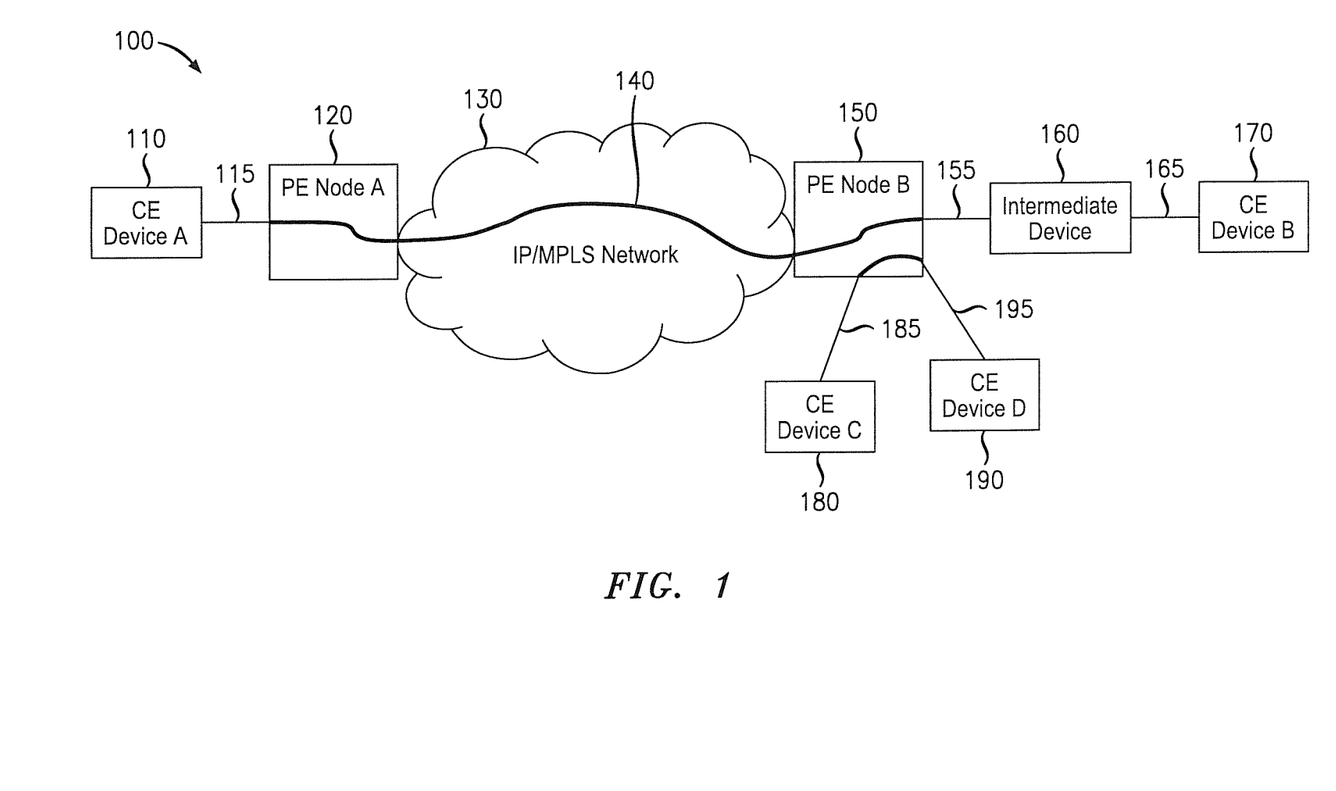
FIG. 1 is a schematic diagram of an exemplary network including provider edge nodes configured to implement virtual leased line services.

FIG. 1 is a schematic diagram of an exemplary network 100 including provider edge nodes 120, 150 configured to implement virtual leased line services. In various exemplary embodiments, network 100 includes customer edge (CE) device A 110, provider edge (PE) node A 120, Internet Protocol/Multiprotocol Label Switching (IP/MPLS) network 130, pseudowire 140, PE node B 150, intermediate network device 160, CE device B 170, CE device C 180, CE device D 190, attachment circuits 115, 155, 185, 195, and link 165.

CE devices 110, 170, 180, 190 may be equipment operated by customers of a service provider. Thus, the CE devices may be router's devices which may be, for example, personal computers, set-top boxes, Voice-over-IP (VoIP) systems, and the like. Alternatively, the CE devices may be network nodes, such as routers, switches, and similar devices. It should be apparent that the customer edge devices may be any devices for which transmission of Layer 2 data over a Layer 3 infrastructure is desired.

CE devices 110, 170, 180, 190 may each be connected to a corresponding PE node by means of an attachment circuit. Each attachment circuit may operate according to a Layer 2 protocol, including, for example, Ethernet, Frame Relay, ATM, and the like. As illustrated, CE device A 110 is directly connected to PE node A 120 through attachment circuit 115. CE device B 170 is connected to PE node B 150 indirectly through intermediate device 160. In particular, PE node B 150 is connected to intermediate device 160 through attachment circuit 155, while intermediate device 160 is connected to CE device B 170 through link 165. Finally, CE device C 180 is connected to PE node B 150 through attachment circuit 185, while CE device D 190 is connected to PE node B 150 through attachment circuit 195.

PE nodes 120, 150 may be network nodes configured to forward data between customer edge devices using IP/MPLS network 130. Thus PE nodes 120, 150 may be routers, switches, or similar hardware devices configured to forward data packets and frames.

As described in further detail below with reference to FIGS. 2-4, each PE node 120, 150 may maintain a cache containing the IP and MAC addresses of each connected customer edge device. For example, PE node A 120 may maintain a cache with the IP and MAC addresses of CE device A 110. Similarly, PE node B 150 may maintain a cache with the IP and MAC addresses of CE devices 170, 180, 190. Furthermore, as also described in detail below, each node 120, 150 may maintain a backup memory with a copy of each IP address of the serviced CE devices.

IP/MPLS network 130 may provide a connection between PE node A 120 and PE node B 150. Network 130 may be any network capable of sending data and requests between PE node A 120 and PE node B 150. Accordingly, network 130 may comprise a plurality of routers, switches, bridges, and other components suitable for receiving and forwarding data packets.

Pseudowire 140 traverses IP/MPLS network 130 and provides IP connectivity between CE device A 110 and CE device B 170. In particular, pseudowire 140 may comprise one or more hops over IP/MPLS network 130, such that the data packets transmitted by PE node A 120 reach PE Node B 150. Thus, pseudowire 140 emulates a point-to-point link and provides a single service that is perceived by the customer to be an unshared link or circuit of the corresponding Layer 2 service.

It should be apparent that, in FIG. 1, a single pseudowire 140 is illustrated for the sake of simplicity. As will be apparent to those of skill in the art, multiple pseudowires 140 may traverse IP/MPLS network, with each pseudowire 140 corresponding to a particular VLL service.

Having described the components of network 100, a brief summary of the operation of network 100 will be provided. It should be apparent that the following description is intended to provide an overview of the operation of network 100 and PE node B 150 and is therefore a simplification in some respects. The detailed operation of node 150 will be described in further detail below in connection with FIGS. 2-5.

During normal operation, PE node A 120 receives a number of Layer 2 frames carrying IP datagrams as the payload from CE device A 110 over attachment circuit 115. PE node A 120 may then identify the appropriate pseudowire, remove the data link header from the frames, and send the exposed IP packet across the appropriate pseudowire to PE node B 150. Upon receipt of the IP packet from PE node A 120, PE node B 150 may determine the destination MAC address corresponding to the destination address of the IP packet, then forward a Layer 2 frame to the outgoing MAC address.

In this manner, PE nodes 120, 150 may interact to provide an IP VLL service, such that CE device A 110 and CE device B 170 may exchange data, even when attachment circuits 115, 165 operate according to different Layer 2 protocols. As will be apparent to those of skill in the art, PE node B 150 may similarly forward packets locally between CE device C 180 and CE device D 190. These processes are equally applicable to IPv4 and IPv6 packets. Further details are provided in the draft, "ARP Mediation for IP Interworking of Layer 2 VPN," published in February 2009 by the L2VPN Working Group of the Internet Engineering Task Force, which is hereby incorporated by reference in its entirety.

In order to properly forward Layer 2 frames from PE node B 150 to CE device B 170, PE node B 150 maintains a mapping between the IP address of CE device B 170 and the MAC address of CE device B 170. In various exemplary embodiments, as described in further detail below with reference to FIG. 2, PE node B 150 maintains this mapping in an internal cache.

In order to populate this cache, PE node B 150 may implement a customer edge discovery feature, thereby eliminating the need for manual configuration of the IP and MAC addresses of the customer edge devices. More specifically, CE devices 170, 180, 190 may periodically send address update messages including their respective IP and MAC addresses. The address update messages may be, for example, Address Resolution Protocol (ARP) replies in IPv4 networks and Neighbor Discovery advertisements in IPv6 networks. Upon receipt of these messages, PE node B 150 may update the cache to reflect the current values of the IP and MAC addresses of the corresponding customer edge device.

Similarly, CE device B 170 may send an address discovery message to PE node B 150, requesting the MAC address corresponding to the IP address of CE device A 110 or a device located in a network coupled to CE device A 110. The address discovery message may be, for example, an ARP request in IPv4 networks or a Neighbor Discovery solicitation in IPv6 networks. Upon receipt of an address discovery message, PE node B 150 may create an entry in its cache for the IP address and MAC address of the device that sent the discovery message, then generate and send a reply, including the IP address and MAC address of the corresponding attachment circuit on PE node B 150. CE device B 170 may update its own cache based on the reply, thereby enabling CE device B 170 to send IP packets to CE device A 110 or a device in the network of CE device A 110 through PE node B 170.

In some circumstances, a cache-clearing event may occur, necessitating that PE node B 150 flush at least a portion of its cache. For example, should an attachment circuit or the corresponding port on PE node B 150 fail, PE node B 150 may clear the cache entries corresponding to the failure. This action may be necessary, as PE node B 150 may no longer trust that the stored addresses are accurate after an interruption in communication. As another example, a network operator may explicitly order that one or more cache entries be removed by providing a command to PE node B 150.

When a cache-clearing event occurs and the entry is removed from the cache, PE node B 150 will be temporarily unable to forward unicast packets to the CE device connected to the corresponding attachment circuit (e.g., CE device B 170), as PE node B 150 will no longer know the MAC address of the CE device. During the time period when PE node B 150 is unaware of the MAC address of CE device B 170, PE node B 150 may only be able to forward multicast and broadcast packets. When restoration of service is desired (e.g., after reboot, restoration of the link/port, receipt of a command, etc.), PE node B 150 will need to learn the MAC address of the CE device.

Such a cache-clearing event may especially pose a problem when the outgoing port on which the attachment circuit is configured is connected to the locally-attached CE device through an intermediate network device, such as an Ethernet switch that does not support Operations, Administration, and Management (OAM) messaging. In such a situation, the CE device may be unaware of a fault on PE node B 150, such that the CE device does not send an address update message until its time-out period expires. The CE device may similarly fail to learn of the cache-clearing event if OAM is not supported on PE node B 150 or the CE device itself, or if OAM is disabled for the particular attachment circuit, for the CE device, or for PE node B 150.

Thus, in current implementations, PE node B 150 may be required to wait for the next address update message from the CE device, which is typically sent infrequently. For example, ARP or Neighbor Discovery messages may be sent by a CE device in the order of tens of minutes. Furthermore, because the CE device is operated by a customer, the service provider will often be unable to modify the timeout period of the CE device. Reducing the timeout period is also an undesirable solution, as it can greatly increase the amount of traffic and processing required to account for more frequent messages.

To address this problem, PE node B 150 may maintain, in a backup memory, a persistent copy of the last-known IP address of the CE device configured on the attachment circuit. Because this copy of the IP address is persistent, it will be maintained even when the cache is cleared.

When an updated MAC address is required for the CE device (e.g., upon restoration of the attachment circuit), PE node B 150 may retrieve the last-known IP address of the CE device and generate an address discovery message requesting the MAC address corresponding to that IP address. PE node B 150 may then send the message over the attachment circuit toward the CE device. Provided that the CE device is still configured with the same IP address, the CE device will respond with an additional address update message including its MAC address. PE node B 150 may, in turn, update its cache and resume forwarding all packets to the CE device.

Figure 2:
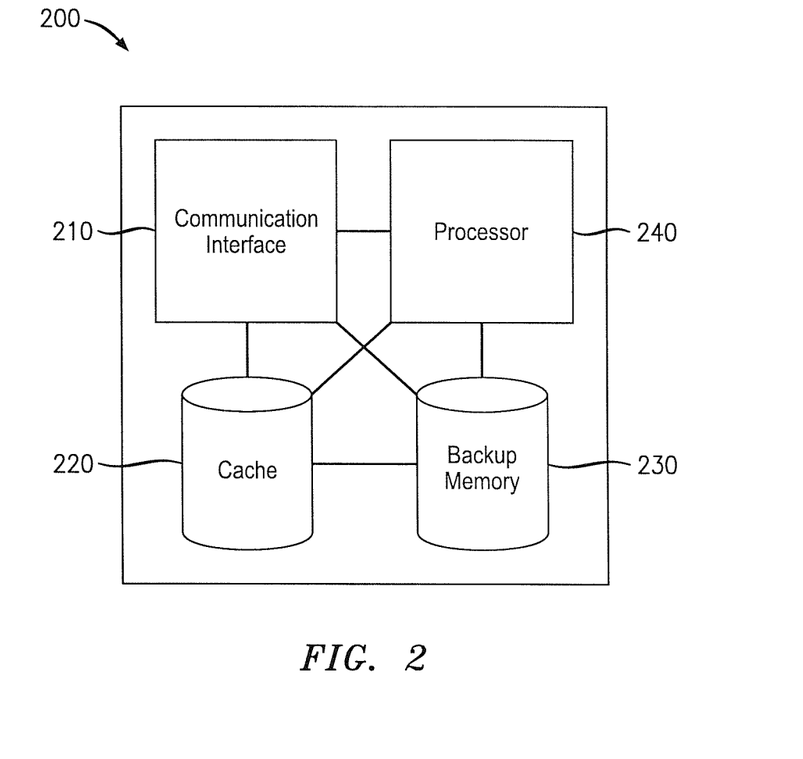
FIG. 2 is a schematic diagram illustrating the components of an exemplary provider edge node for use in the network of FIG. 1.

FIG. 2 is a schematic diagram illustrating the components of an exemplary provider edge node 200 for use in network 100 of FIG. 1. Node 200 may correspond, for example, to PE nodes 120, 150 of network 100. Node 200 may include communication interface 210, cache 220, backup memory 230, and processor 240.

Communication interface 210 may include hardware and/or executable instructions encoded on a machine-readable storage medium configured to receive and transmit frames and packets over a data communication network. More specifically, communication interface 210 may be configured to transmit and receive IP packets over an IP network, such as IP/MPLS network 130. Communication interface 210 may be further configured to transmit and receive Layer 2 frames using one or more Layer 2 protocols, such as Ethernet, ATM, and Frame Relay. It should be apparent that, although illustrated as a single box, the functionality of communication interface 210 may be divided into multiple components, such that the operations of receiving and transmitting frames and packets are performed by separate components.

Cache 220 may be a machine-readable storage medium that maintains an association between an IP address of a customer edge device and a corresponding MAC address of the customer edge device. Cache 220 may store a separate entry comprising an IP address of a customer edge device and a corresponding MAC address for each attachment circuit configured to provide a VLL service. Alternatively, a separate cache 220 may be used for each attachment circuit. It should be apparent, however, that any arrangement may be used for cache 220, provided that the cache identifies a customer edge device IP and MAC address for each attachment circuit.

Backup memory 230 may be a machine-readable storage medium that maintains a copy of the last-known IP address of a customer edge device for each attachment circuit configured to provide a VLL service. Backup memory 230 may comprise any type of memory, provided that the last-known IP address remains intact even when one or more values in cache 220 are cleared. It should be apparent that, although illustrated as separate from cache 220, backup memory 230 may be part of the same memory as cache 220, provided that the last-known IP addresses are saved when the cache is cleared.

Processor 240 may be a conventional microprocessor, a Field Programmable Gate Array (FPGA), or any other component configured to execute a series of instructions to perform any operations necessary for the functionality of provider edge node 200. In particular, processor 240 may implement the functionality required to update cache 220 and backup memory 230, generate address discovery messages, and process packets and frames. This functionality is described in further detail below with reference to FIG. 5. Other suitable functionality for execution by processor 240 will be apparent to those of skill in the art.

Figure 3:
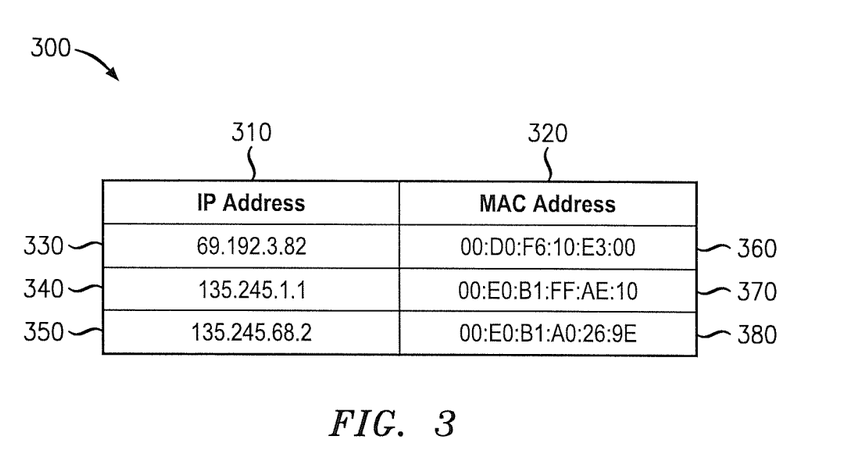
FIG. 3 is a table of an exemplary data arrangement used to maintain a mapping between IP and MAC addresses of customer edge devices.

FIG. 3 is a table of an exemplary data arrangement 300 used to maintain a mapping between IP and MAC addresses of customer edge devices. Data arrangement 300 may be stored in cache 220 and may be, for example, a table. Alternatively, data arrangement 300 could be a series of linked lists, a binary tree, an array, or a similar data structure. Thus, it should be apparent that data arrangement 300 is an abstraction of the underlying data; any data structure suitable for storage of this data may be used.

Data arrangement 300 may include two sets of data: an IP address field 310 and a MAC address field 320. Other fields suitable for inclusion in data arrangement 300 will be apparent to those of skill in the art. For example, data arrangement 300 may also include a field identifying the VLL attachment circuit on which the corresponding customer edge device is configured.

IP address field 310 may indicate the IP address of a customer edge device coupled to the provider edge node on which data arrangement 300 is stored. Similarly, MAC address field 320 may indicate the MAC address of the customer edge device corresponding to the IP address.

As an example, suppose that data arrangement 300 is maintained in a cache 220 of PE node B 150 of FIG. 1. Entry 330 indicates that the IP address of CE device B 170 is 69.192.3.82, while entry 360 indicates that the corresponding MAC address of CE device B 170 is 00:D0:F6:10:E3:00. Similarly, entry 340 indicates that the IP address of CE device C 180 is 135.245.1.1, while entry 370 indicates that the corresponding MAC address of CE device C 180 is 00:E0:B1:FF:AE:10. Finally, entry 350 indicates that the IP address of CE device D 190 is 135.245.68.2, while entry 380 indicates that the corresponding MAC address of CE device D 190 is 00:E0:B1:A0:26:9 E.

Figure 4:
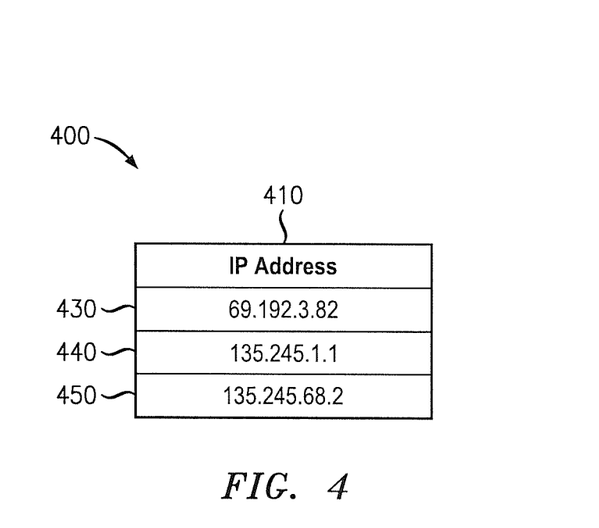
FIG. 4 is a table of an exemplary data arrangement used to maintain a backup copy of IP addresses of customer edge devices.

FIG. 4 is a table of an exemplary data arrangement 400 used to maintain a backup copy of IP addresses of customer edge devices. Data arrangement 400 may be stored in backup memory 230 and may be, for example, a table. Alternatively, data arrangement 400 could be a series of linked lists, a binary tree, an array, or a similar data structure. Thus, it should be apparent that data arrangement 400 is an abstraction of the underlying data; any data structure suitable for storage of this data may be used.

Data arrangement 400 may include one field, IP address field 410. IP address field 410 may indicate a last-known IP address of a customer edge device for which a VLL service is provided by the node on which data arrangement 400 is maintained. As with data arrangement 300, data arrangement 400 may also include a field identifying the attachment circuit on which the corresponding customer edge device is configured.

As an example, suppose that data arrangement 400 is maintained in a backup memory 230 of PE node B 150 of FIG. 1. Entry 430 indicates that the last-known IP address of CE device B 170 is 69.192.3.82. Similarly, entry 440 indicates that the last-known IP address of CE device C 180 is 135.245.1.1. Finally, entry 450 indicates that the last-known IP address of CE device D 190 is 135.245.68.2.

Figure 5:
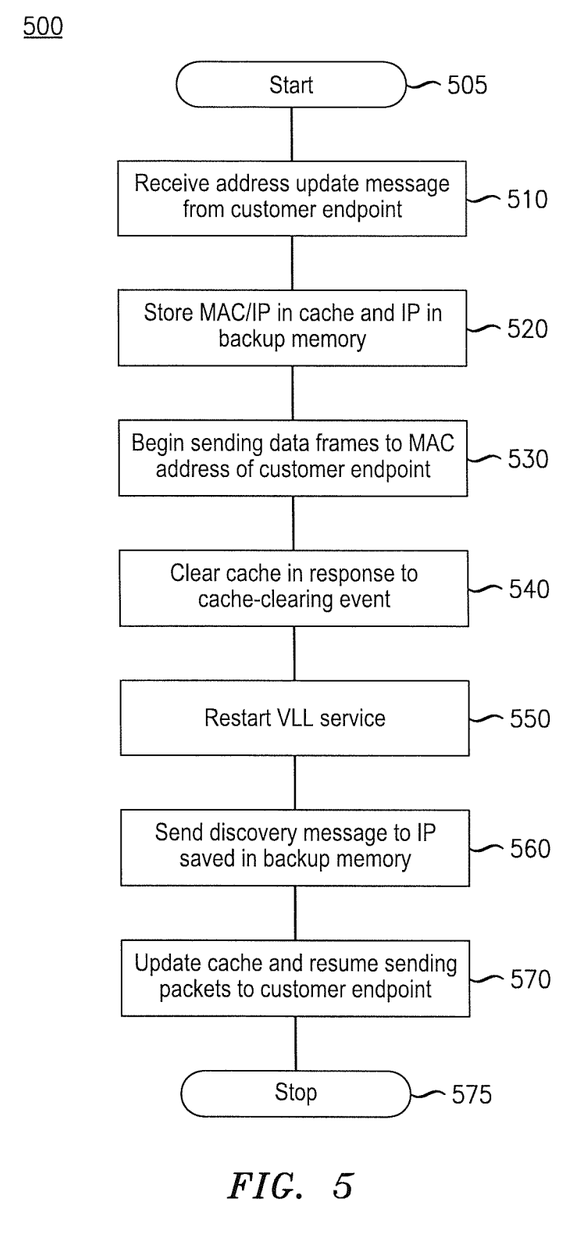
FIG. 5 is a flowchart of an exemplary method of maintaining updated addresses of customer edge devices on a provider edge node.

FIG. 5 is a flowchart of an exemplary method 500 of maintaining updated addresses of customer edge devices on a provider edge node. Method 500 may be performed by, for example, a processor 240 included in provider edge node B 150 of network 100. Although the steps shown in FIG. 5 are described as performed by node 150, other suitable components or systems for execution of method 500 will be apparent to those of skill in the art.

Method 500 starts in step 505 and proceeds to step 510, where node 150 receives an address update message from a customer endpoint. For example, node 150 may receive an ARP or Neighbor Discovery message specifying the IP address and corresponding MAC address of a customer edge device that accesses a VLL service provided on node 150.

Method 500 then proceeds to step 520, where node 150 stores the values of the IP address and MAC address of the customer endpoint. As an example, node 150 may store both the IP address and MAC address in cache 220, while storing only the IP address in backup memory 230.

Because node 150 is now aware of both the IP address and MAC address of the corresponding customer endpoint, method 500 proceeds to step 530, where node 150 begins sending data frames to the MAC address of the customer endpoint. More specifically, node 150 may receive IP data packets transmitted over pseudowire 140, determine the MAC address corresponding to the destination IP address of the packets, then forward the Layer 2 frames to the outgoing MAC address.

In response to a cache-clearing event, method 500 proceeds to step 540, where node 150 clears at least one entry from its cache 220. As described in further detail above, the cache-clearing event may correspond to a failure on node 150 or may be a command from the user. Other events necessitating removal of entries from cache 220 will be apparent to those of skill in the art.

When a cache-clearing event occurs and the entry is removed from the cache, PE node B 150 will be temporarily unable to forward unicast packets to the CE device. When restoration of service is desired (e.g., after reboot, restoration of the link/port, receipt of a command, etc.), method 500 proceeds to step 550, where steps are taken to restore VLL service to the CE device.

In particular, in step 560, node 150 retrieves the last-known IP address of the CE device from backup memory 230 and generates an address discovery message requesting the MAC address corresponding to that IP address. Node 150 may set the source IP address of the discovery message to the IP address of the far-end CE device connected through pseudowire 140, which, in this case, is CE device A 110.

Alternatively, in some situations, node 150 may not know the IP address of the far-end device. For example, if the far-end attachment circuit operates according to ATM or Frame Relay and inverse ARP is not enabled, node 150 may not be aware of the far-end IP address. In these situations, node 150 may set the source IP address of the discovery message to a dummy value (e.g., 0.0.0.0). Whether it uses a dummy value or an actual IP address, node 150 may then send the discovery message to a broadcast MAC address (e.g., FF:FF:FF:FF:FF:FF), requesting the MAC address corresponding to the last-known IP address of the CE device.

Provided that the CE device is still configured with the same IP address, the CE device will respond with an additional address update message including its MAC address. Method 500 then proceeds to step 570, where PE node B 150 may receive and process the response from the CE device, update its cache based on the response, and resume forwarding of all packets to the CE device. Finally, method 500 proceeds to step 575, where method 500 stops.

As an example of the operation of the various exemplary embodiments, with reference to FIGS. 1-5, assume that CE device A 110 desires to send Layer 2 frames to CE device B 170. PE node A 120 and PE node B 150 may first be configured based on address update messages received from CE device A 110 and CE device B 170, respectively. In particular, PE node A 120 may maintain a cache storing the IP and MAC addresses of CE device A 110, while PE node B 150 may maintain a cache storing the IP and MAC addresses of CE device B 170.

When CE device A 110 seeks to transmit Layer 2 frames to CE device B 170, device 110 may simply transmit the frames to the attachment circuit configured on PE node A 120. The payload of the frames may include a destination set to the IP address of CE device B 170 (69.192.3.82). Alternatively, CE device A 110 may set the IP address to some other address, provided that PE node A 120 may perform a lookup to determine the IP address of CE device B 170.

Upon receipt of the frames, PE node A 120 may then remove the data link header from the frames, and send the exposed IP packet across pseudowire 140. Upon receipt of the IP packet containing a destination address of 69.192.3.82, PE node B 150 may look up the corresponding MAC address in its cache 220, and send the Layer 2 frame to the resulting address, 00:D0:F6:10:E3:00.

Should the cache entry corresponding to CE device B 170 in cache 220 of PE node B 150 be cleared, PE node B 150 may quickly determine the MAC address when restoration of service is required. In particular, PE node B 150 may read the saved IP address of CE device B 170 from backup memory 230, then send an address discovery message (e.g., an ARP request or Neighbor Discovery solicitation) requesting the MAC address corresponding to the saved IP (69.192.3.82). Assuming CE device B 170 has maintained the same IP address, PE node B 150 will receive a response from CE device B 170, and may then resume forwarding of Layer 2 frames.

According to the foregoing, various exemplary embodiments provide a number of benefits. In particular, by maintaining a backup memory including the last-known IP address of a customer edge device, a provider edge node may quickly resume service after an event requiring that its cache be cleared. In particular, the provider edge node may send an address discovery message to the last known IP address of the customer edge device without waiting for an address update message or increasing the rate of such messages. Such an arrangement minimizes delays in restoring service, while avoiding an increase in the number of messages that must be processed and exchanged.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g., router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A provider edge node for allowing a customer edge device to access a Virtual Leased Line (VLL) service, the provider edge node comprising:
   a cache that is configured to store an association between an Internet Protocol (IP) address of the customer edge device and a Media Access Control (MAC) address of the customer edge device;
   a backup memory that maintains a persistent copy of a last-known IP address of the customer edge device during a cache-clearing event in the cache, wherein the backup memory does not store the MAC address;
   a communication interface that is configured to transmit data packets to the MAC address of the customer edge device; and
   a processor that is configured to update the cache upon receipt of an address update message from the customer edge device, the address update message indicating the IP address and the MAC address of the customer edge device, removes the stored association from the cache in response to the cache-clearing event, while maintaining the persistent copy of the last-known IP address in the backup memory, wherein the cache-clearing event temporarily interrupts connectivity to the customer edge device, at a time subsequent to removal of the stored association from the cache, sends an address discovery message using the communication interface, the address discovery message requesting an updated MAC address corresponding to the last-known IP address maintained in the backup memory, and updates the cache to reflect the updated MAC address upon receipt of an additional address update message from the customer edge device, wherein the address update message and the additional address update message are Neighbor Discovery Protocol advertisements and the address discovery message is a Neighbor Discovery Protocol solicitation.

2. The provider edge node of claim 1, wherein the communication interface transmits data packets to the customer edge device through an intermediate network device that is unable to notify the customer edge device of faults resulting in the cache-clearing event.

3. The provider edge node of claim 2, wherein the intermediate network device is an Ethernet switch for which Ethernet Operations, Administration, and Management (OAM) fault messaging is disabled or not supported.

4. The provider edge node of claim 1, wherein OAM fault messaging is disabled or not supported on at least one of the provider edge node, the customer edge device and an attachment circuit configured on the provider edge node to provide the VLL service and the customer edge device is unaware of faults resulting in the cache-clearing event.

5. The provider edge node of claim 1, wherein the cache-clearing event is a failure of an attachment circuit configured on the provider edge node to provide the VLL service to the customer edge device.

6. The provider edge node of claim 1, wherein the cache-clearing event is a command from a network operator to clear the cache.

7. The provider edge node of claim 1, wherein the processor sets a source IP address field of the address discovery message to a dummy value.

8. The provider edge node of claim 7, wherein the dummy value is 0.0.0.0.

9. The provider edge node of claim 1, wherein the processor sets a source IP address field of the address discovery message to an IP address of a far-end customer edge device coupled to the customer edge device through a pseudowire.

10. A method for allowing a customer edge device to access a Virtual Leased Line (VLL) service provided by a provider edge node, the method comprising:
   storing, in a cache on the provider edge node, an association between an Internet Protocol (IP) address of the customer edge device and a Media Access Control (MAC) address of the customer edge device, wherein the IP address and the MAC address are included in an address update message received from the customer edge device;
   storing, in a backup memory in the provider edge node, a persistent copy of a last-known IP address of the customer edge device, wherein the backup memory does not store the MAC address;
   removing the stored association from the cache in response to a cache-clearing event, while maintaining the persistent copy of the last-known IP address in the backup memory, wherein the cache-clearing event temporarily interrupts connectivity to the customer edge device;
   at a time subsequent to removal of the stored association from the cache, sending an address discovery message, the address discovery message requesting an updated MAC address corresponding to the last-known IP address maintained in the backup memory;
   updating the cache to reflect the updated MAC address upon receipt of an additional address update message from the customer edge device; and
   transmitting data packets to the MAC address of the customer edge device included in the additional address update message, wherein the address update message and the additional address update message are Neighbor Discovery Protocol advertisements and the address discovery message is a Neighbor Discovery Protocol solicitation.

11. The method of claim 10, further comprising:
   coupling the provider edge node to the customer edge device through an intermediate network device that is unable to notify the customer edge device of faults resulting in the cache-clearing event.

12. The method of claim 11, wherein the intermediate network device is an Ethernet switch for which Ethernet Operations, Administration, and Management (OAM) fault messaging is disabled or not supported.

13. The method of claim 10, wherein OAM fault messaging is disabled or not supported on at least one of the provider edge node, the customer edge device and an attachment circuit are configured on the provider edge node to provide the VLL service, and the customer edge device is unaware of faults resulting in the cache-clearing event.

14. The method of claim 10, wherein the cache-clearing event is a failure of an attachment circuit configured on the provider edge node to provide the VLL service to the customer edge device.

15. The method of claim 10, wherein the cache-clearing event is a command from a network operator to clear the cache.

16. The method of claim 10, further comprising:
   setting a source IP address field of the address discovery message to a dummy value.

17. The method of claim 16, wherein the dummy value is 0.0.0.0.

18. The method of claim 10, further comprising:
   setting a source IP address field of the address discovery message to an IP address of a far-end customer edge device coupled to the customer edge device through a pseudowire.

* * * * *